United States Patent
Toda

(10) Patent No.: US 11,420,542 B2
(45) Date of Patent: Aug. 23, 2022

(54) IMPACT ABSORBING DEVICE AND VEHICLE SEAT

(71) Applicant: TACHI-S CO., LTD., Tokyo (JP)

(72) Inventor: Naoki Toda, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 257 days.

(21) Appl. No.: 16/915,355

(22) Filed: Jun. 29, 2020

(65) Prior Publication Data
US 2021/0001757 A1  Jan. 7, 2021

(30) Foreign Application Priority Data

Jul. 1, 2019 (JP) .............................. JP2019-123074

(51) Int. Cl.
*B60N 2/427* (2006.01)
*B60N 2/42* (2006.01)
*B60N 2/20* (2006.01)

(52) U.S. Cl.
CPC ........... *B60N 2/42736* (2013.01); *B60N 2/20* (2013.01); *B60N 2/42781* (2013.01)

(58) Field of Classification Search
CPC ............ B60N 2/42709; B60N 2/42745; B60N 2/4228; B60N 2/42736; B60R 22/28; B64D 11/0619
USPC .......................... 297/216.13, 216.14, 216.15
See application file for complete search history.

(56) References Cited

U.S. PATENT DOCUMENTS

| 5,645,316 A | 7/1997 | Aufrere et al. |
| 10,814,756 B2* | 10/2020 | Kato .................. B60N 2/68 |
| 2008/0100104 A1 | 5/2008 | Axelsson et al. |
| 2010/0194157 A1 | 8/2010 | Nitsuma et al. |
| 2011/0074189 A1 | 3/2011 | Sawada |
| 2012/0146370 A1* | 6/2012 | Lee ..................... B60N 2/4228 297/216.14 |
| 2013/0049416 A1 | 2/2013 | Funke et al. |
| 2013/0200666 A1 | 8/2013 | Huttemann et al. |

(Continued)

FOREIGN PATENT DOCUMENTS

| CN | 102056764 A | 5/2011 |
| CN | 105416122 A | 3/2016 |

(Continued)

OTHER PUBLICATIONS

May 17, 2022, Chinese Office Action issued for related CN Application No. 202010627518.3.

*Primary Examiner* — Sarah B Mcpartlin
(74) *Attorney, Agent, or Firm* — Paratus Law Group, PLLC

(57) ABSTRACT

An impact absorbing device for a vehicle seat includes: a first base member; a second base member; and an impact absorbing member. The first base member rotatably supports the second base member. The impact absorbing member includes: a first fixing portion fixed to the first base member; a second fixing portion fixed to the second base member; and a deformable portion. The deformable portion is provided between the first fixing portion and the second fixing portion, and is configured to be bent by the rotation of the second base member. A distance between the first fixing portion and the second fixing portion in an undeformed state of the deformable portion has a value intermediate in a range of variation of the distance that varies depending on the bending of the deformable portion.

5 Claims, 11 Drawing Sheets

(56) References Cited

U.S. PATENT DOCUMENTS

2016/0075262 A1    3/2016  Huttemann et al.
2020/0171986 A1*  6/2020  Höpfner ............ B60N 2/42781

FOREIGN PATENT DOCUMENTS

| DE | 102009057880 A1 | 6/2011 |
|----|-----------------|--------|
| JP | H09-024756 A | 1/1997 |
| JP | 2012-071799 A | 4/2012 |
| JP | 2017-149391 A | 8/2017 |
| WO | WO 2007/042106 A1 | 4/2007 |

* cited by examiner

IMPACT ABSORBING DEVICE AND VEHICLE SEAT

CROSS REFERENCE TO RELATED APPLICATIONS

This application claims priority to Japanese Patent Application No. 2019-123074 filed on Jul. 1, 2019, the content of which is incorporated herein by reference.

BACKGROUND

Field of the Invention

The present invention relates to an impact absorbing device and a vehicle seat.

Related Art

In a vehicle such as an automobile, a seat belt is used as a safety device for protecting an occupant in a collision, and a force limiter for the seat belt is known as an auxiliary device for improving performance on protecting the occupant. The force limiter gradually loosens the seat belt, and reduces an impact applied to the occupant restrained on a seat by the seat belt. Another configuration of a seat for reducing an impact applied to an occupant includes use of plastic deformation of a frame member of the seat or the like (for example, see JP-Hei-9-24756-A and JP-2012-71799-A).

A seat described in JP-Hei-9-24756-A is a belt-in seat in which a retractor for winding a seat belt is built in. A seat back frame is divided into a lower structure and an upper structure supported by the lower structure so as to be tiltable forward. An upper end of a shoulder strap of a seat belt is fixed to a side frame on one side of the upper structure, and a torsion bar is bridged between the side frame on the one side of the upper structure to which the shoulder strap is fixed and a side frame on an opposite side of the lower structure. When a tensile force exceeding a predetermined force is applied to the shoulder strap in a front collision, the upper structure tilts forward with the torsion of the torsion bar, reducing the impact.

A seat described in JP-2012-71799-A includes a bracket fixed to a seat cushion frame, a base plate fixed to a seat back frame, and an impact absorbing plate bridged between the bracket and the base plate. When an impact force exceeding the rigidity of the impact absorbing plate is applied to a seat back in a rear collision or a front collision rebound, the seat back tilts backward with the bending deformation of the impact absorbing plate, absorbing the impact.

The impact absorption of the seat described in JP-Hei-9-24756-A works in a front collision in which a forward load is applied to the seat back, but fail to work in a rear collision. On the other hand, the impact absorption of the seat described in JP-2012-71799-A works in a rear collision or a front collision rebound in which a rearward load is applied to the seat back, but fail to work in a front collision.

SUMMARY

Illustrative aspects of the present invention provide an impact absorbing device and a vehicle seat capable of absorbing an impact both in a front collision and a rear collision.

According to an illustrative aspect of the present invention, an impact absorbing device for a vehicle seat includes: a first base member configured to be fixed to a seat cushion of the vehicle seat; a second base member configured to be fixed to a seat back of the vehicle seat; and an impact absorbing member bridged between the first base member and the second base member. The first base member rotatably supports the second base member, and allows the seat back to tilt with rotation of the second base member. The impact absorbing member includes: a first fixing portion fixed to the first base member on an axis different from a rotation axis of the second base member; a second fixing portion fixed to the second base member on an axis different from the rotation axis of the second base member; and a deformable portion. The deformable portion is provided between the first fixing portion and the second fixing portion, and is configured to be bent by the rotation of the second base member. A distance between the first fixing portion and the second fixing portion in an undeformed state of the deformable portion has a value intermediate in a range of variation of the distance that varies depending on the bending of the deformable portion.

According to another aspect of the present invention, a vehicle seat includes: a seat cushion; a seat back; a seat belt including a shoulder strap, for restraining an occupant to the seat back, fixed to the seat back; and the impact absorbing device described above.

DETAILED DESCRIPTION OF THE EXEMPLARY EMBODIMENTS

Figure 1:
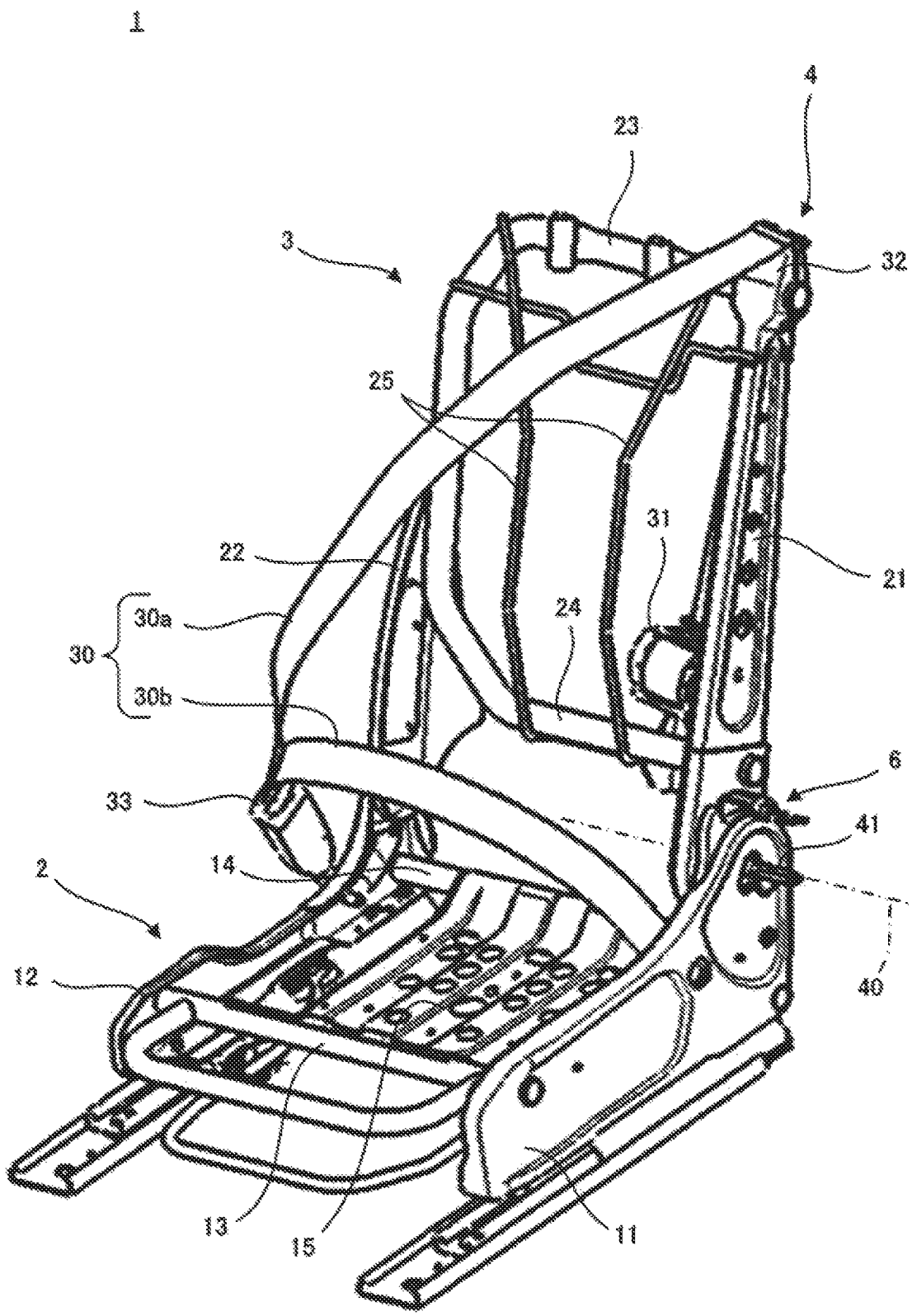
FIG. 1 is a perspective view showing a vehicle seat according to an embodiment of the present invention.

FIG. 1 shows a vehicle seat according to an embodiment of the present invention.

A vehicle seat 1 is a seat mounted on a vehicle such as an automobile. The seat 1 includes a seat cushion 2 that supports the buttocks and thighs of an occupant seated on the seat 1, a seat back 3 that supports the waist and the back of the seated occupant, a seat belt 4, and an impact absorbing device 5.

The seat cushion 2 has a cushion frame as a framework of the seat cushion. The cushion frame is covered with a cushion pad (not shown) made of relatively soft resin foam such as urethane foam, and further covered with a trim cover made of skin materials such as leather (natural leather, synthetic leather), woven fabric, nonwoven fabric, or knit. The cushion frame includes a pair of cushion side frames 11, 12 spaced apart from each other in a seat width direction, and a front frame 13 and a rear frame 14 connecting the pair of cushion side frames 11, 12 to each other. The front frame 13 and the rear frame 14 are spaced apart from each other in a front-rear direction of the seat, and a panel 15 that supports the cushion pad extends between the front frame 13 and the rear frame 14.

The seat back 3 has a back frame as a framework of the seat back. The back frame is also covered with a cushion pad (not show) and further covered with a trim cover. The back frame includes a pair of back side frames 21, 22 spaced apart from each other in the seat width direction, and an upper frame 23 and a lower frame 24 connecting the pair of back side frames 21, 22 to each other. The upper frame 23 and the lower frame 24 are spaced apart from each other in an upper-lower direction of the seat, and a plurality of wires 25 that supports the cushion pad extends between the upper frame 23 and the lower frame 24.

The seat belt 4 includes a strap 30 and a retractor 31 that winds up the strap 30. The retractor 31 is incorporated in the seat back 3, and the strap 30 is pulled out from the retractor 31 to a front side of the seat back 3 via an anchor 32 provided at an upper end portion of the back side frame 21. When the seat belt 4 is used, an intermediate portion of the pulled-out strap 30 is locked by a buckle 33 provided on the cushion side frame 12, and a shoulder strap 30a between the anchor 32 and the buckle 33 is wound obliquely from the shoulder to the waist of the occupant, and restrains the occupant to the seat back 3. A lap strap 30b between the buckle 33 and an end portion of the strap 30 is wound across the waist of the occupant and restrains the occupant on the seat cushion 2.

The retractor 31 is configured to automatically lock, for example, when a sudden deceleration acts in a front collision, and to prevent the strap 30 from loosening. The retractor 31 may have a function of a so-called pretensioner that automatically winds up the strap 30 when a sudden deceleration is applied and actively restrains the occupant to the seat back 3.

The impact absorbing device 5 includes an impact absorbing member that plastically deforms when an excessive load is applied to the seat back 3 in a rear collision and a front collision. The impact absorbing device 5 absorbs an impact by using the plastic deformation of the impact absorbing member. In parallel with the plastic deformation of the impact absorbing member, the seat back 3 tilts in a direction in which the load acts.

The seat 1 shown in FIG. 1 is a reclining seat, and further includes a reclining device 6. The seal back 3 can tilt in the front-rear direction of the seal around a rotation axis 40. The reclining device 6 is disposed between a rear end portion of the cushion side frame 11 intersecting with the rotation axis 40 and a lower end portion of the back side frame 21, and holds the seat back 3 at a variable tilt angle. However, the reclining device 6 is normally locked, and the reclining device 6 has nothing to do with the tilting of the seat back 3 in an impact absorption operation of the impact absorbing device 5 accompanying the tilting of the seat back 3. The reclining device 6 may be omitted.

Figure 2:
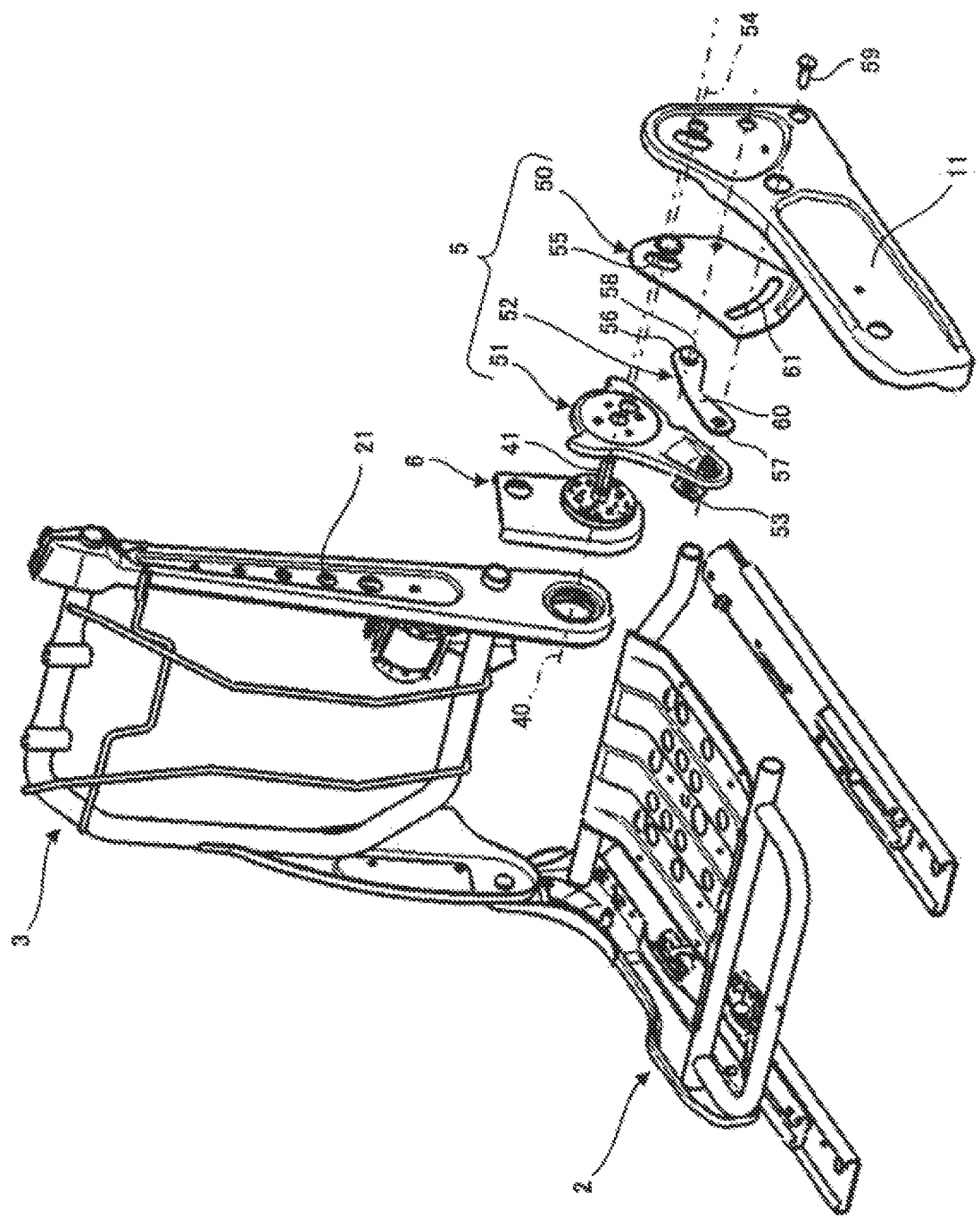
FIG. 2 is an exploded perspective view showing an impact absorbing device for the vehicle seat shown in FIG. 1.
Figure 3:
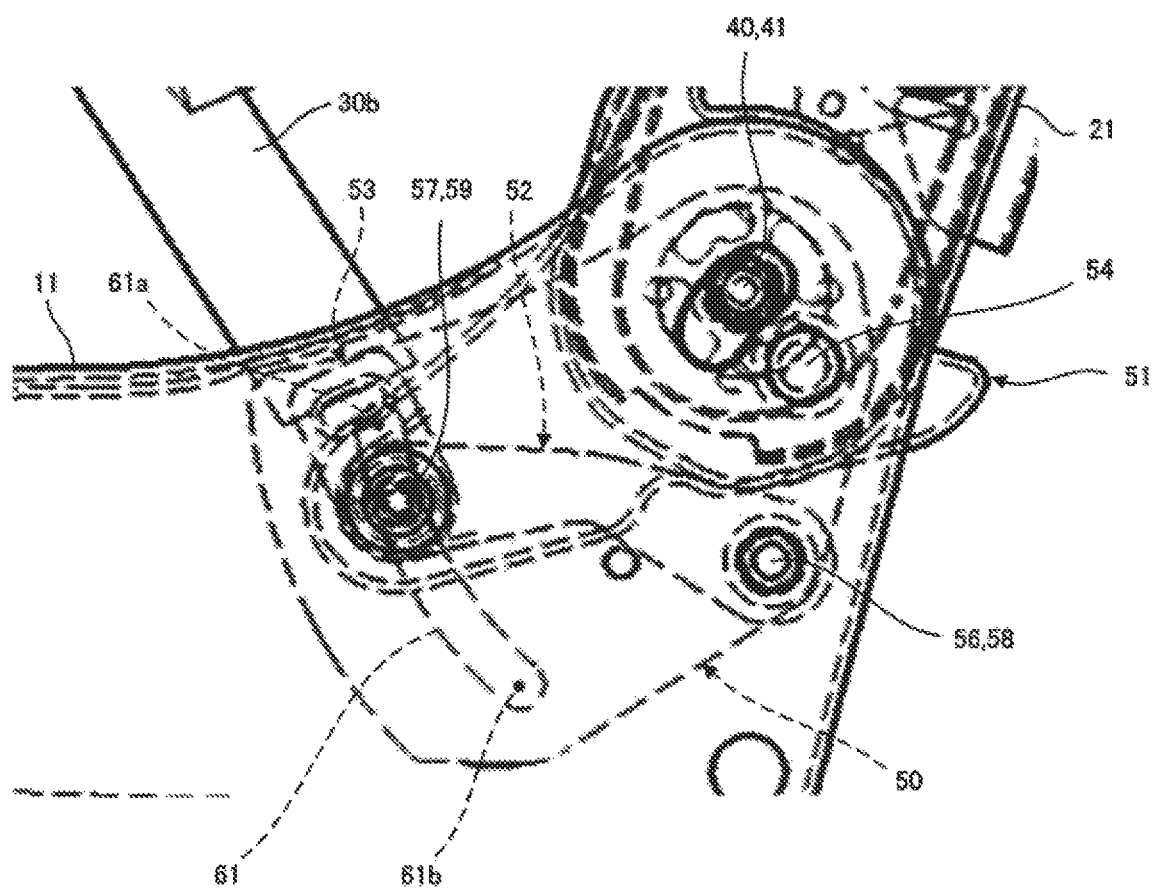
FIG. 3 is a front view showing the impact absorbing device shown in FIG. 2.
Figure 4:
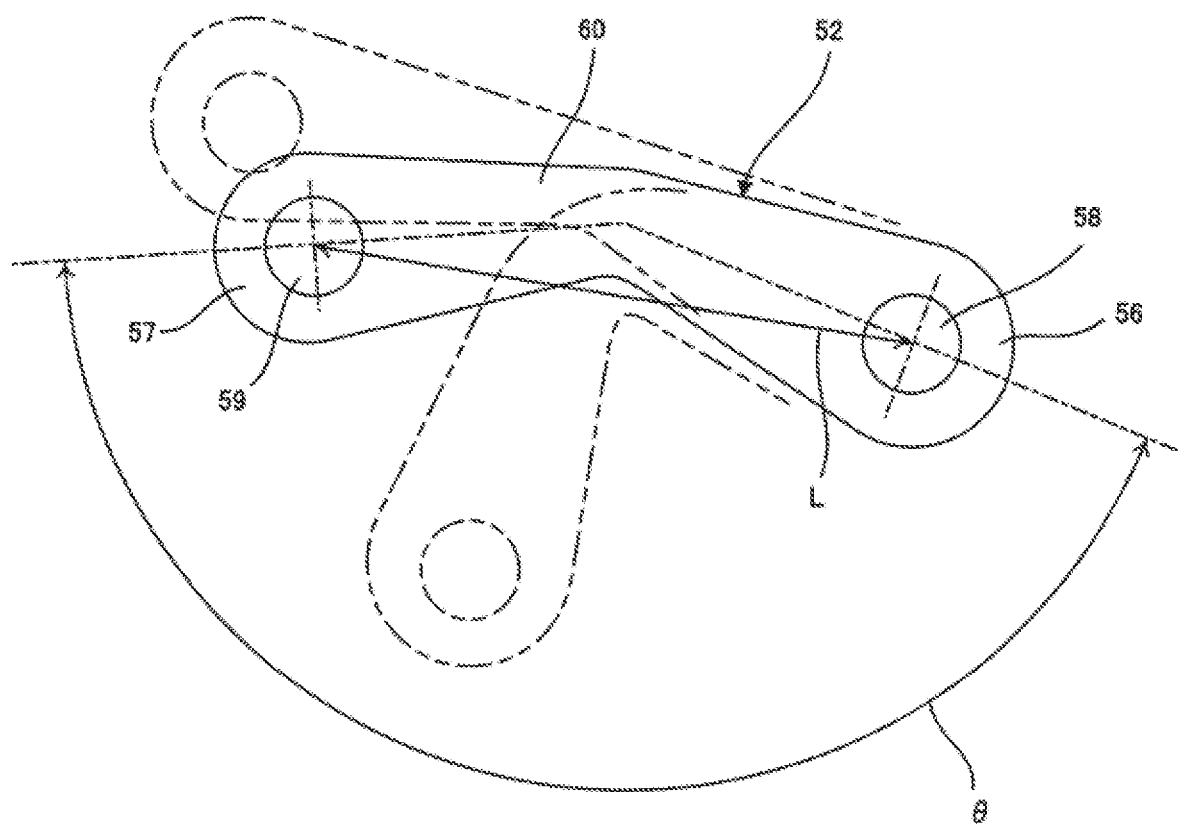
FIG. 4 is a schematic view illustrating an impact absorbing member of the impact absorbing device shown FIG. 2.

FIGS. 2 to 4 shows the impact absorbing device 5.

The impact absorbing device 5 includes a first base member 50, a second base member 51, an impact absorbing member 52, and a bracket 53.

The first base member 50 is fixed to the rear end portion of the cushion side frame 11 of the seat cushion 2, and the second base member 51 is fixed to the lower end portion of the back side frame 21 of the seat back 3 via the reclining device 6. When the reclining device 6 is in an unlocked state, the back side frame 21 is independent of the second base member 51, and is rotatable around the rotation axis 40 of the reclining device 6. On the other hand, when the reclining device 6 is in a locked state, the back side frame 21 and the second base member 51 are integrated. Hereinafter, a description will be given assuming that the reclining device 6 is in the locked state.

The second base member 51 is supported by the first base member 50 in such a manner that the second base member 51 is rotatable around a rotation axis 54. The rotation axis 54 may be the same as the rotation axis 40 of the reclining device 6, but is different from the rotation axis 40 in the embodiment shown in FIGS. 2 and 3. The first base member 50 has a first guide hole 55 extending in an arc shape around the rotation axis 54, and a shaft 41 as the rotation axis 40 is accommodated in the first guide hole 55. When the second base member 51 rotates around the rotation axis 54, the shaft 41 moves along the first guide hole 55.

The impact absorbing member 52 is a plastically deformable member made of, for example, metal such as steel, and is bridged between the first base member 50 and the second base member 51. The impact absorbing member 52 has an elongated plate shape, and includes a first fixing portion 56 at one end and a second fixing portion 57 at the other end. The first fixing portion 56 is fixed to the first base member 50 with a pin 58, and is rotatable around the pin 58. The second fixing portion 57 is fixed to the second base member 51 with a pin 59, and is rotatable around the pin 59.

The pin 58 and the pin 59 are disposed on an axis different from the rotation axis 54. Consequently, when the second base member 51 rotates around the rotation axis 54, a distance 1, between the pin 58 on the first base member 50 and the pin 59 on the second base member 51, changes. The impact absorbing member 52 prevents the rotation of the second base member 51 accompanying the change in the distance L with the strength and rigidity thereof.

However, a moment is generated to rotate the second base member 51 integrated with the back side frame 21 when the upper body of an occupant is pressed against the seat back 3 in a rear collision, or when the upper body of the occupant who falls forward is restrained to the seat back 3 by the shoulder strap 30a in a front collision. This moment generates a stress in the impact absorbing member 52. When the stress generated in the impact absorbing member 52 exceeds an allowable yield stress of the impact absorbing member 52, the impact absorbing member 52 plastically deforms. The impact absorbing member 52 includes a deformable portion 60 between the first fixing portion 56 and the second fixing portion 57, and the deformable portion 60 plastically bends. The distance L between the first fixing portion 56 and the second fixing portion 57 (the distance between the pin 58 and the pin 59) changes according to the bending of the deformable portion 60. Accordingly, the rotation of the second base member 51 is allowed.

Here, the distance L between the first fixing portion 56 and the second fixing portion 57 in an undeformed state of the deformable portion 60 has a value intermediate in a range of variation of the distance L that varies depending on the bending of the deformable portion 60. The value intermediate in the range of variation of the distance L is at least a value between the upper limit value and the lower limit value of the variation of the distance L, and is not limited to a median value that bisects the range of variation of the distance L. The range of variation of the distance L is appropriately set in consideration of the strength, toughness or the like of the material of the impact absorbing member 52, and is defined by a second guide hole 61. The second guide hole 61 is provided in the first base member 50, and extends in an arc shape around the rotation axis 54. A distal end portion of the pin 59 is accommodated in the second guide hole 61, and the pin 59 moves along the second guide hole 61 when the second base member 51 rotates around the rotation axis 54.

A first end portion 61a of the second guide hole 61 defines the upper limit value of the variation of the distance L and prevent the exceeding bending of the deformable portion 60 in which the distance L exceeds the upper limit value by contacting the pin 59. A second end portion 61b of the second guide hole 61 defines the lower limit value of the variation of the distance L, and prevent the exceeding bending of the deformable portion 60 in which the distance L exceeds the lower limit value by contact the pin 59. In an undeformed state of the deformable portion 60, the pin 59 is disposed at an intermediate portion between the first end portion 61a and the second end portion 61b of the second guide hole 61. The pin 59 moves toward the first end portion 61a or the second end portion 61b in response to the bending of the deformable portion 60. Consequently, the distance L increases or decreases.

Although the deformable portion 60 that increases or decreases the distance L by Lending may be, for example, curved in a wave shape, or folded in a bellows shape, and may be bent to expand and contract the wave shape or the bellows shape, the deformable portion 60 is preferably planar in the undeformed state of the deformable portion 60 and has a bent V-shape as a whole as shown in FIG. 4. The deformable portion 60 having the bent V-shape increases and decrease the distance L by bending in such a manner that a bending angle θ increases and decreases. The deformable portion 60 may has a curved V-shape as a whole. The deformable portion 60 being flat and having a bent V-shape or curved U-shape keeps its thickness substantially constant before and after the deformation, and provides the impact absorbing device 5 with compactness.

Figure 5:
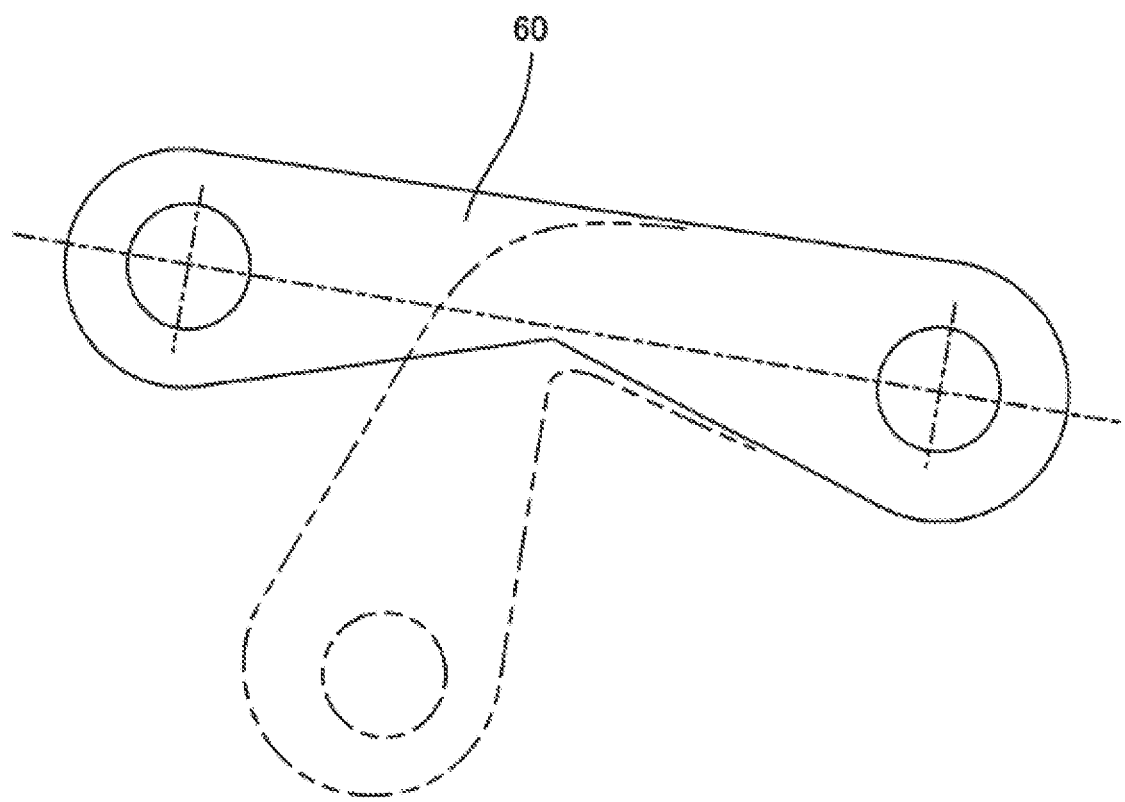
FIG. 5 is a schematic view illustrating an impact absorbing member of a reference example.

As long as the deformable portion 60 has a bent V-shape or curved U-shape, the deformable portion 60 may decrease its width gradually from the first fixing portion 56 and the second fixing portion 57 toward the center portion. Accordingly, the deformable portion 60 bends easily. Also in a reference example shown in FIG. 5, the width of the central portion of the deformable portion 60 is relatively small due to having a V-shaped notch, but the deformable portion is linear as a whole. In this case, the distance L never increase by bending of the deformable portion 60, but only decreases.

The bracket 53 holds the lap strap 30b of the seat belt 4, and is fixed to the second base member 51. The bracket 53 may be fixed to any portion within the second base member 51 other than the rotation axis 54, and is fixed to the pin 59 in the embodiment shown in FIGS. 2 and 3, and is rotatable around the pin 59. When the upper body of an occupant who falls forward is restrained to the seat back 3 by the shoulder strap 30a in a front collision, a load applied to the shoulder strap 30a is transmitted to the lap strap 30b and is input to the bracket 53 as a tensile load.

Figure 6:
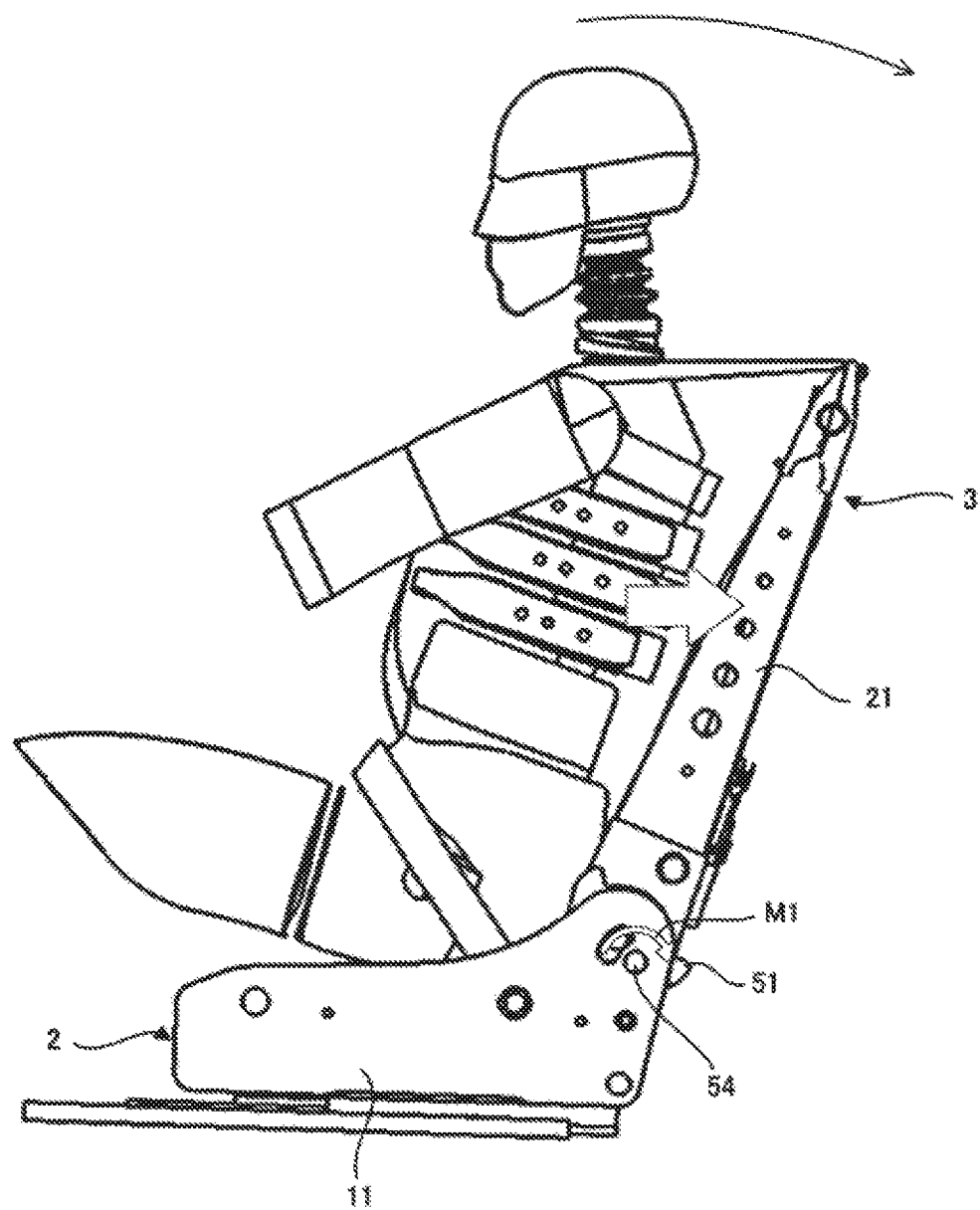
FIG. 6 is a schematic view illustrating a load input to the vehicle seat shown in FIG. 1 in a rear collision.
Figure 7A:
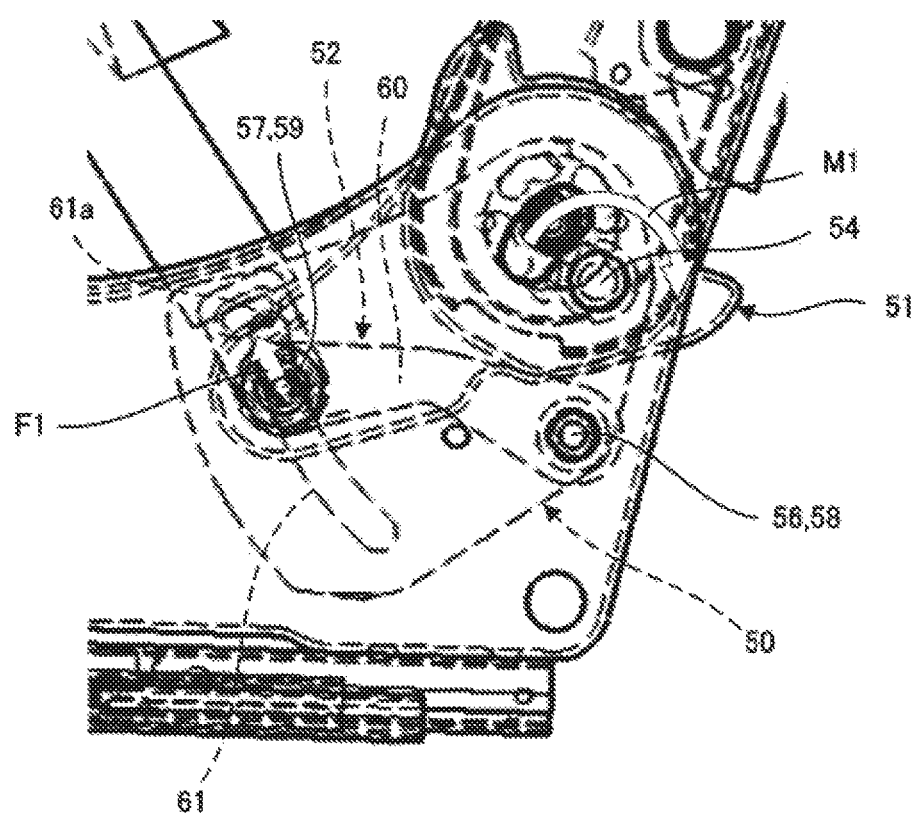
FIG. 7A is a schematic view illustrating an operation of the impact absorbing device shown in FIG. 2 in a rear collision.
Figure 7B:
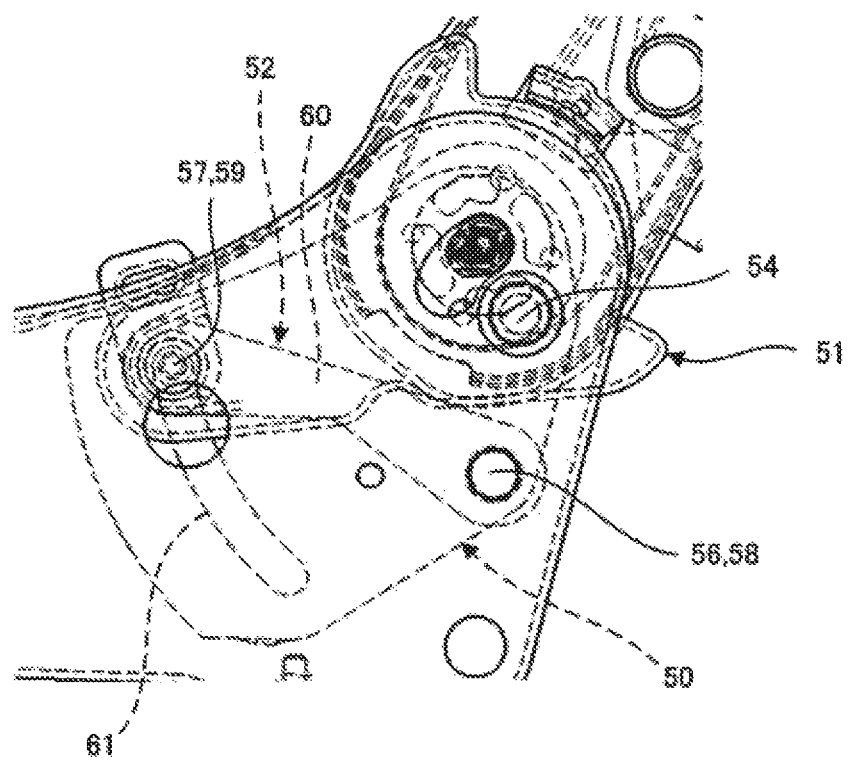
FIG. 7B is a schematic view illustrating the operation of the impact absorbing device shown in FIG. 2 in a rear collision.

FIGS. 6, 7A and 7B show an operation of the impact absorbing device 5 in a rear collision.

As shown in FIG. 6, in a rear collision, the upper body of an occupant is pressed against the seat back 3. Then a moment M1 rotating the second base member 51 integrated with the back side frame 21 is generated. The moment M1 is a moment that rotates the second base member 51 in a direction in which the seat back 3 tilts backward.

As shown in FIG. 7A, the moment M1 forces the second base member 51 to rotate in a direction in which the pin 59 on the second base member 51 moves toward the first end portion 61a of the second guide hole 61. Then a load F1 is applied to the second fixing portion 57 of the impact absorbing member 52 fixed to the pin 59, and generates a bending moment to the impact absorbing member 52. When a stress based on the bending moment exceeds the allowable yield stress of the impact absorbing member 52, the impact absorbing member 52 deforms plastically.

As shown in FIG. 7B, the deformable portion 60 of the impact absorbing member 52 bends plastically, and the distance L, between the first fixing portion 56 and the second fixing portion 57, increases. Accordingly, the pin 59 moves along the second guide hole 61 to the first end portion 61a, allowing the rotation of the second base member 51, and the seat back 3 tilts backward by a predetermined angle. While the seat back 3 tilts backward, the impact absorbing member 52 consumes a part of the energy of the collision by its plastic deformation, and absorbs the impact.

Figure 8:
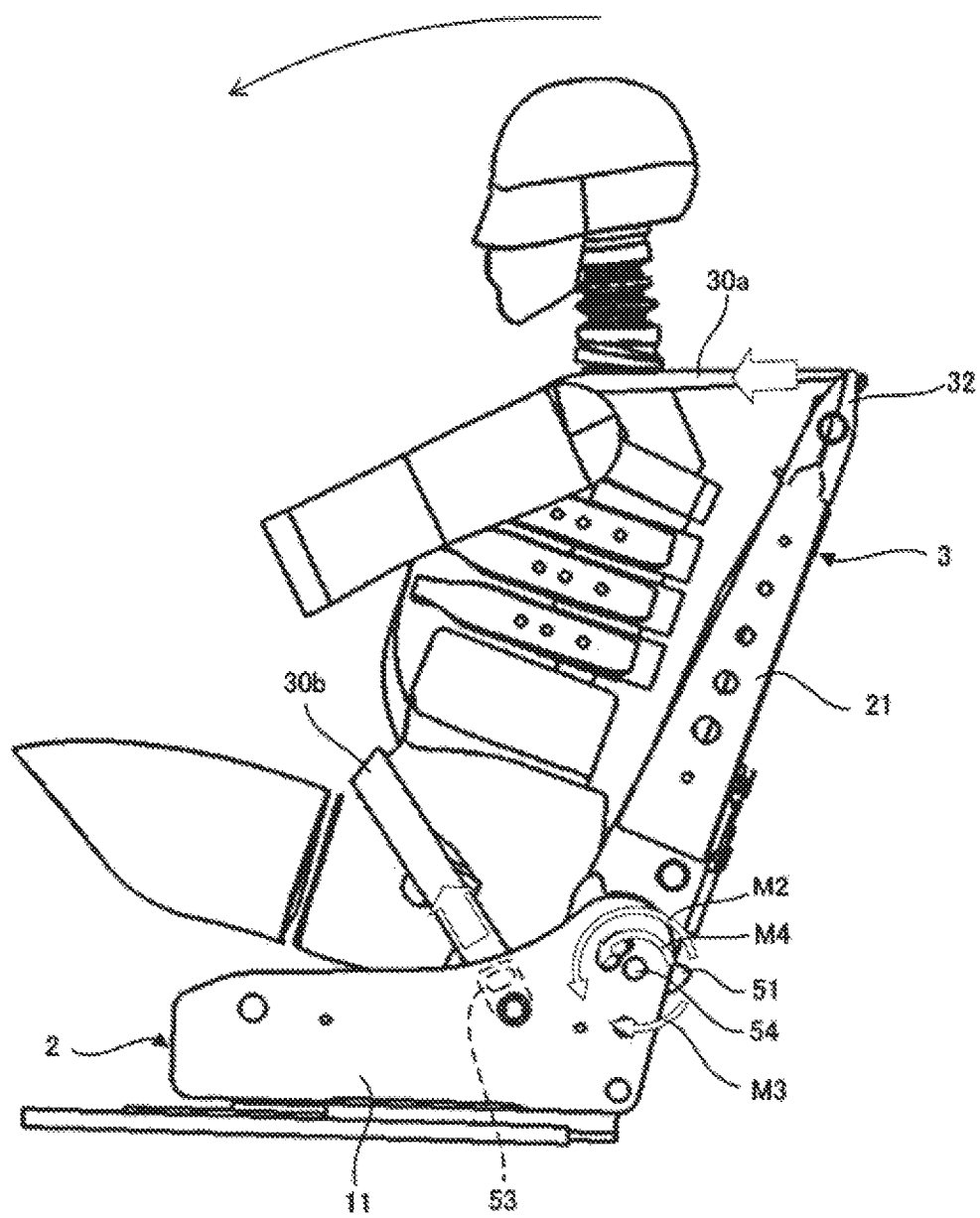
FIG. 8 is a schematic view illustrating a load input to the vehicle seat shown in FIG. 1 in a front collision.
Figure 9A:
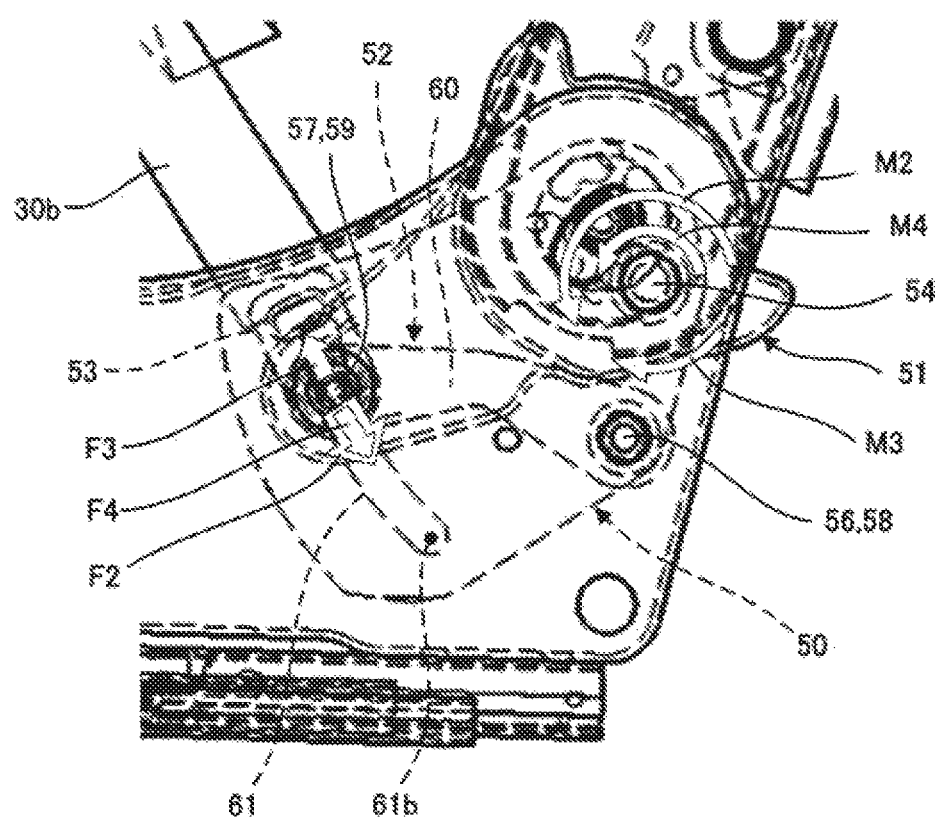
FIG. 9A is a schematic view illustrating an operation of the impact absorbing device shown in FIG. 2 in a front collision.
Figure 9B:
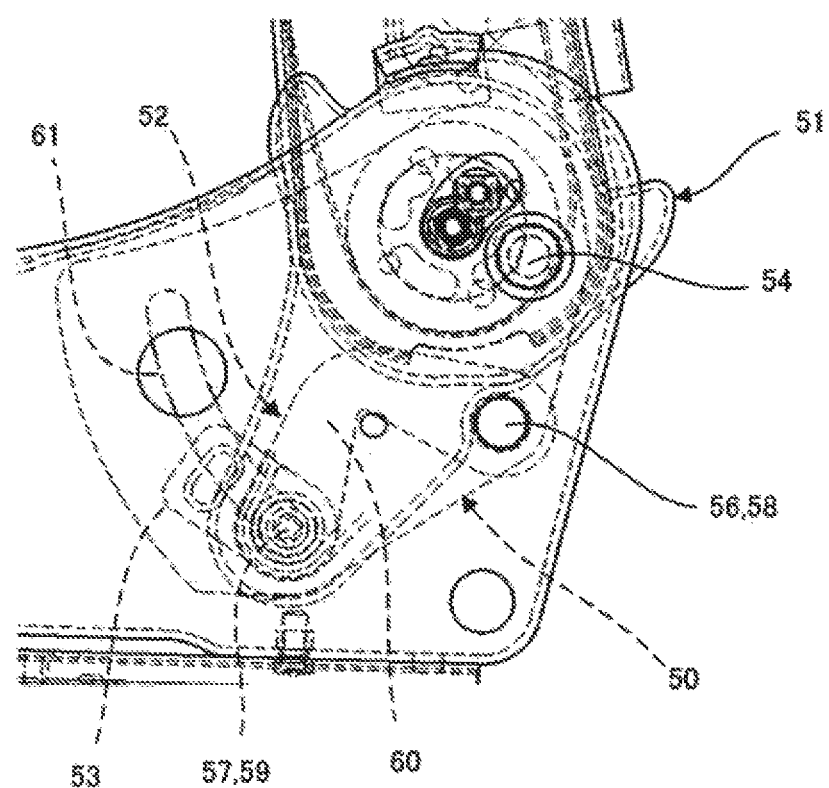
FIG. 9B is a schematic view illustrating the operation of the impact absorbing device shown in FIG. 2 in a front collision.

FIGS. 8, 9A and 9B show an operation of the impact absorbing device 5 in a front collision.

As shown in FIG. 8, in a front collision, the upper body of an occupant who falls forward is restrained to the seat back 3 by the shoulder strap 30a. A load applied to the shoulder strap 30a is input to the upper end portion of the back side frame 21 provided with the anchor 32 for fixing the shoulder strap 30a. A tensile load of the shoulder strap 30a input to the back side frame 21 generates a moment M2 that rotates the second base member 51 integrated with the back side frame 21. The moment M2 is a moment that rotates the second base member 51 in a direction in which the seat back 3 tilts forward together with the upper body of an occupant who falls forward.

The load applied to the shoulder strap 30a is transmitted to the lap strap 30b and is input to the bracket 53 as a tensile load. The tensile load of the lap strap 30b input to the bracket 53 generates a moment M3 that rotates the second base member 51. The moment M3 is a moment that rotates the second base member 51 in a direction in which the seat back 3 tilts backward, and is opposite to the moment M2.

A moment M4, which is a combination of the moment M2 and the moment M3, acts on the second base member 51. Although the tensile load of the lap strap 30b is commonly about 1.3 to 2 times the tensile load of the shoulder strap 30a, a distance between the upper end portion of the back side frame 21 to which the tensile load of the shoulder strap 30a is input and the rotation axis 54 is twice greater than a distance between the pin 59 to which the tensile load of the lap strap 30b is input and the rotation axis 54, so that the moment M2 exceeds the moment M3. As a result, similar to the moment M2, the moment M4 is a moment that rotates the second base member 51 in the direction in Which the seat back 3 tilts forward.

As shown in FIG. 9A, the moment M4 forces the second base member 51 to rotate in a direction in which the pin 59 on the second base member 51 moves toward the second end portion 61b of the second guide hole 61. Then a load F4 is applied to the second fixing portion 57 of the impact absorbing member 52 fixed to the pin 59, and generates a bending moment to the impact absorbing member 52. When a stress based on the bending moment exceeds the allowable yield stress of the impact absorbing member 52, the impact absorbing member 52 deforms plastically.

As shown in FIG. 9B, the deformable portion 60 of the impact absorbing member 52 bends plastically, and the distance L between the first fixing portion 56 and the second fixing portion 57 decreases. Accordingly, the pin 59 moves along the second guide hole 61 to the second end portion 61b, allowing the rotation of the second base member 51, and the seat back 3 tilts forward by a predetermined angle. While the seat back 3 tilts forward, the impact absorbing member 52 consumes a part of the energy of the collision by its plastic deformation, and absorbs the impact.

As described above, the impact absorbing device 5 absorbs the impact by plastically bending the deformable portion 60 of the impact absorbing member 52, and setting the distance L between the first fixing portion 56 and the second fixing portion 57 in the undeformed state of the deformable portion 60 to a value intermediate in a range of variation of the distance L that varies depending on the bending of the deformable portion 60 allows the impact absorbing device 5 absorbing the impact in both a rear collision and a front collision.

In a rear collision, it is particularly required to reduce damage to the neck of an occupant. The energy absorbed by the plastic deformation of the impact absorbing member 52 relates to a deformation load and a deformation amount. Since the neck is easily damaged, the deformation load F1 of the impact absorbing member 52 in the rear collision is set to a relatively small value.

On the other hand, in a front collision, it is also required to reduce damage to the chest of an occupant, and further to avoid contact between the occupant and obstacles in front such as a steering wheel and an instrument panel. Since the chest is more robust than the neck, the deformation load of the impact absorbing member 52 in a front collision can be increased, but the deformation load F4 in the front collision is substantially equal to the deformation load F1 in the rear collision, and the deformation load F1 is set to a relatively small value on the basis of the neck as described above.

However, the deformation load F4 due to the moment M4 can be taken as a load obtained by combining the load F2 due to the moment M2 in the same direction as the moment M4, and the load F3 due to the moment M3 in the opposite direction to that of the moment M2. A part of the energy of the collision is consumed to plastically deform the impact absorbing member 52 against the load F3, and the energy to be absorbed by the plastic deformation of the impact absorbing member 52 decreases. This reduces the deformation amount of the impact absorbing member 52, lessens forward tilting of the seat back 3, and avoids the contact between the obstacles in front and the occupant more reliably.

Further, in response to the rotation of the second base member 51 in a front collision, the bracket 53 fixed to the second base member 51 is moved at least toward a bottom of the seat, pulling in the lap strap 30b held by the bracket 53, and stiffening the restraint on the occupant to the seat cushion 2.

Here, the present invention has been described by taking the vehicle seat 1 installed on a vehicle such as an automobile as an example, but the present invention can also be applied to a vehicle seat installed on other vehicles such as a ship or an aircraft.

As described above, an impact absorbing device for a vehicle seat according to the embodiments of the invention includes: a first base member configured to be fixed to a seat cushion of the vehicle seat; a second base member configured to be fixed to a seat back of the vehicle seat; and an impact absorbing member bridged between the first base member and the second base member. The first base member rotatably supports the second base member, and allows the seat back to tilt with rotation of the second base member. The impact absorbing member includes: a first fixing portion fixed to the first base member on an axis different from a rotation axis of the second base member; a second fixing portion fixed to the second base member on an axis different from the rotation axis of the second base member; and a deformable portion provided between the first fixing portion and the second fixing portion, and configured to be bent by the rotation of the second base member. A distance between the first fixing portion and the second fixing portion in an undeformed state of the deformable portion has a value intermediate in a range of variation of the distance that varies depending on the bending of the deformable portion.

The deformable portion in the undeformed state may be planar, and may have a bent V-shape or curved U-shape.

The impact absorbing device may further include a bracket holding the lap strap of a seat belt, in which the bracket is fixed to the second base member. A moment around the rotation axis of the second base member caused by a tensile load of the lap strap input to the bracket and acting on the second base member may be opposite to a moment that rotates the second base member in a direction in which the seat back tilts forward.

The bracket may move at least toward a bottom of the vehicle seat when the second base member rotates in the direction in which the seat back tilts forward.

A vehicle seat according to the embodiments of the invention includes: a seat cushion; a seat back; a seat belt including a shoulder strap for restraining an occupant to the seat back, the shoulder strap being fixed to the seat back; and the impact absorbing device described above.

What is claimed is:

1. An impact absorbing device for a vehicle seat, comprising:
   a first base member configured to be fixed to a seat cushion of the vehicle seat;
   a second base member configured to be fixed to a seat back of the vehicle seat; and
   an impact absorbing member bridged between the first base member and the second base member,
   the first base member rotatable supporting the second base member, and allowing the seat back to tilt with rotation of the second base member,
   the impact absorbing member including:
      a first fixing portion fixed to the first base member on an axis different from a rotation axis of the second base member;
      a second fixing portion fixed to the second base member on an axis different from the rotation axis of the second base member; and
      a deformable portion provided between the first fixing portion and the second fixing portion, and configured to be bent by the rotation of the second base member,
   wherein a distance between the first fixing portion and the second fixing portion in an undeformed state of the deformable portion has a value intermediate in a range of variation of the distance that varies depending on the bending of the deformable portion.

2. The impact absorbing device according to claim 1, wherein the deformable portion in the undeformed state is planar and has a bent V-shape or a curved U-shape as a whole.

3. The impact absorbing device according to claim 1, further comprising a bracket holding the lap strap of a seat belt, wherein the bracket is fixed to the second base member, and wherein a moment around the rotation axis of the second base member caused by a tensile load of the lap strap input to the bracket and acting on the second base member is opposite to a moment that rotates the second base member in a direction in which the seat back tilts forward.

4. The impact absorbing device according to claim 3, wherein the bracket is at least moved toward a bottom of the vehicle seat when the second base member rotates in the direction in which the seat back tilts forward.

5. A vehicle seat, comprising:

a seat cushion;

a seat back;

a seat belt including a shoulder strap for restraining an occupant to the seat back, the shoulder strap being fixed to the seat back; and the impact absorbing device according to claim 1.

\* \* \* \* \*